United States Patent [19]

Fleming et al.

[11] Patent Number: 5,356,685
[45] Date of Patent: Oct. 18, 1994

[54] RECORDABLE OPTICAL ELEMENT HAVING A LEUCO DYE

[75] Inventors: James C. Fleming, Webster; Michael R. Detty, Rochester, both of N.Y.

[73] Assignee: Eastman Kodak Company, Rochester, N.Y.

[21] Appl. No.: 19,935

[22] Filed: Feb. 19, 1993

[51] Int. Cl.$^5$ ................................................. B32B 3/00
[52] U.S. Cl. ........................................ 428/64; 428/65; 428/457; 428/913; 430/270; 430/945; 346/76 L; 346/135.1
[58] Field of Search ............... 428/64, 65, 457, 913; 430/945, 270; 346/76 L, 135.1; 369/288

[56] References Cited

U.S. PATENT DOCUMENTS

| | | | |
|---|---|---|---|
| 4,529,684 | 7/1985 | Sasagawa | 430/269 |
| 4,584,258 | 4/1986 | Detty et al. | 430/270 |
| 4,940,618 | 7/1990 | Hamada et al. | 428/64 |
| 5,075,146 | 12/1991 | Satake | 428/64 |
| 5,100,711 | 3/1992 | Satake | 428/64 |

FOREIGN PATENT DOCUMENTS

| | | | |
|---|---|---|---|
| 2005520 | 6/1990 | Canada | C07D 487/14 |
| 0353393 | 4/1989 | European Pat. Off. | G11B 7/00 |

OTHER PUBLICATIONS

James C. Fleming, Optical Recording in Organic Media: Thickness Effect, Journal of Imaging Science, vol. 33, No. 3, May/Jun. 1989.
Alan B. Marchant, Optical Recording, 1990, pp. 23–40.
Masaru Matsuoka, Infrared Absorbing Dyes, 1990, pp. 19–33.

*Primary Examiner*—Patrick J. Ryan
*Assistant Examiner*—Elizabeth Evans
*Attorney, Agent, or Firm*—Raymond L. Owens

[57] ABSTRACT

There is disclosed a recordable optical element that includes a dye. The element has a substrate and on the surface of the substrate, a dye containing recording layer and a light reflecting layer. The improvement is that the dye is a leuco dye.

13 Claims, 1 Drawing Sheet

RECORDABLE OPTICAL ELEMENT HAVING A LEUCO DYE

CROSS-REFERENCE TO RELATED APPLICATIONS

Reference is made to commonly assigned U.S. patent application Ser. No. 08/019,943 filed 19 Feb. 1993 to Fleming et al, entitled "OPTICAL RETRIEVAL APPARATUS USING A LEUCO DYE" and U.S. patent application Ser. No. 08/019,522 filed 19 Feb. 1993 to Fleming et al, entitled "RECORDABLE OPTICAL ELEMENT HAVING A LEUCO DYE", the teachings of which are incorporated herein by reference.

FIELD OF THE INVENTION

The present invention relates to optical recording elements, particularly to those that are useful as recordable compact discs.

BACKGROUND OF THE INVENTION

There are many types of optical recording materials that are known. In many of the materials, the mode of operation requires that the unrecorded material have a high absorption and that the recorded areas, often referred to as pits, have high reflection. The high reflection pits are made by ablating away the high absorption recording material, usually exposing an underlying reflective support.

One of the currently popular forms of optical recordable element is the compact disc or CD. Digital information is stored in the form of low reflectivity marks or pits on an otherwise reflective background, the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the specular reflectivity is lower than in those areas not having the deformations.

It is desirable to produce optical recording elements which, when recorded in real time, produce a record that mimics the conventional CD on read out. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a conventional CD type player into a conventional television. Since a CD has a capacity for a number of digitized images that is greater than the typical roll of consumer film, it is anticipated that the user will want to add images and information to a partially recorded CD. Thus there exists the need for recordable, CD compatible optical recording material.

One method for forming a recordable element that mimics conventional mold pressed CD elements is to provide a transparent heat deformable support having thereon, in order, a layer of a dye that absorbs recording radiation and a reflective layer. Exposure of the recording layer through the support by the recording beam heats the recording layer to an extent that it is said that the surface of the heat-deformable support just adjacent to the recording-layer surface is deformed. Materials of this type are described in U.S. Pat. No. 4,940,618, European Patent Application 0353393 and Canadian Patent 2,005,520.

In the U.S. patent and the European application mentioned above, the preferred dyes for the recording layer are indodicarbocyanine dyes. However, this type of dye does not have archival light stability and will in fact fade to an unusable state in only a few days of exposure to intense sunlight. These applications also disclose one phthalocyanine dye, that is a phthalocyanine dye that has a tert-butyl substituent in one of the $\beta$ positions on the aromatic rings of the dye. Similarly, the Canadian application mentioned above describes a large number of phthalocyanine dyes. However, all of these phthalocyanine dyes, while having excellent stability, are difficult and expensive to make. For a discussion of cyanine dyes, see *Infrared Absorbing Dyes*, edited by M. Matsuoka, Pages 19–33, Plenum Publishing Corporation, New York (1990).

For example, the phthalocyanine dyes of the Canadian application are made by first preparing components of the completed ring, which components have the necessary substituents, and then forming the phthalocyanine ring structure by thermally reacting the mixture with a metallic derivative and effecting ring closure. This is an expensive process characterized by low yield and difficult processes for separation of the desired dye from unreacted components. In a mass produced consumer product, cost of the recording layer dye is a major concern.

SUMMARY OF THE INVENTION

Thus, it is an object of this invention to provide a recordable element which incorporates a need for optical recording materials that do not depend on thermal deformation and are less expensive than previously used phthalocyanine dyes.

This object is achieved by a recordable optical element having a substrate and on the surface of the substrate, a dye-containing recording layer and a light reflecting layer, the improvement wherein the dye is a leuco dye which upon activation such as by thermally induced reaction becomes an absorbing dye.

This invention produces near-infrared, read-laser-absorbing dyes by the thermal conversion of a leuco dye to an infrared absorbing dye. It is an advantage of this invention that leuco dyes that are usable in accordance with this invention, do not absorb near-infrared light and are suitable for use in recordable compact discs. It is another advantage of this invention that the dye generation can be the product of thermal reductive elimination. The rate of this reaction can be controlled by both the duration and intensity of the write-laser pulse as well as by the chemical structure of the leuco dye.

Other advantages of the present invention include:

(1) Critical demands on the optical constants of the dye layer are lifted.

(2) The sensitizing dye(s) may be selected such that broad wavelength sensitivity is possible.

(3) The leuco dye(s) and its conjugate infrared absorbing dye(s) may be selected such that broad wavelength readability is possible.

(4) The recording medium does not require a deformable substrate or interlayer.

(5) Dyes in accordance with this invention permit the use of a binder which can improve the structural integrity of the package, such as by employing polymeric binders in the dye layer.

DETAILED DESCRIPTION OF THE INVENTION

Figure 1:
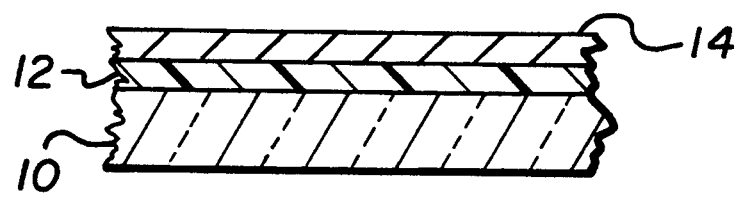
FIG. 1 is a schematic representation, in cross-section, of one element in accordance with the invention.
Figure 2:
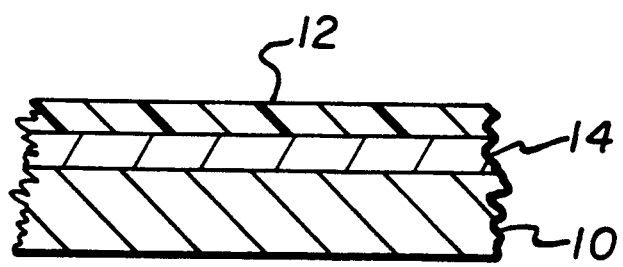
FIG. 2 is a schematic representation, in cross-section, of another element in accordance with the invention.

Optical elements according to this invention as shown in FIGS. 1 and 2 include at least three layers. The substrate 10 has thereon, an optical recording layer 12, and a reflective layer 14. Protective layers may also be used but will not be discussed since they are not necessary for the practice of this invention. See James C. Fleming, "Optical Recording in Organic Media: Thickness Effects", Journal of Imaging Science, Vol. 33, No. 3, May/June 1989, Pages 65-68.

In FIG. 1 the substrate is transparent and light which illuminates the recording layer 12 passes through the substrate 10. In FIG. 2, the substrate is opaque or transparent and light directly illuminates the recording layer.

Recording is accomplished by dye marking in the recording layer 12 with a write laser focused on the recording layer 12, either through the substrate (FIG. 1) or directly (FIG. 2). A second dye is formed in the recording layer in response to light absorbed by the sensitizing dye. The second dye is absorptive toward the light of the read laser. The record thus consists of dark marks of relatively low reflectivity on a background of relatively high reflectivity in relation to the read laser light.

The preferred embodiment of the invention is that of a writable compact disc (CD) as shown in FIG. 1. The write and read lasers are of the laser diode type and operate in the infrared region between 770 and 830 nm. The write laser power is selected to cause a chemical reaction of the leuco dye to produce a dye forming a dark spot whereas the power of the read laser will not cause such a chemical reaction. For a more complete explanation of optical recording and playback processes as well as the construction of compact discs, see *Optical Recording*, Alan B. Marchant, Pages 23-40, Addison-Wesley Publishing Company, Reading, Mass. (1990).

The following is a more detailed discussion of the optical element.

The Support

For FIG. 1, supports can be made from optically transparent resins with or without surface treatment. For FIG. 2, the substrate may be opaque relative to write/read laser light. The preferred resins for the FIG. 1 embodiment are polycarbonates and polyacrylates. The support may include a guide groove for laser tracking.

Recording Layer

The recording layer includes a leuco dye dye, a sensitizing dye and a binder. In addition, useful addenda for the recording layer, may include stabilizers, surfactants, binders and diluents.

Solvent Coatings

Coating solvents for the recording layer are selected to minimize their effect on the support. Useful solvents include alcohols, ethers, hydrocarbons, hydrocarbon halides, cellosolves, ketones and water. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellusolve, ethyl cellusolve, 1-methoxy-2-propanol, methyl ethyl ketone, 4-hydroxy-4-methyl-2-pentanone, hexane, cyclohexane, ethylcyclohexane, octane, benzene, toluene, and xylene. Other less desirable solvents include dimethylsulfoxide and dimethylformamide. Preferred solvents are hydrocarbon solvents and alcohol solvents since they have the least effect on the preferred polycarbonate substrate.

The Reflective Layer

The reflective layer can be any of the metals conventionally used for optical recording materials. Useful metals can be vacuum evaporated or sputtered and include gold, silver, aluminum, copper, and alloys thereof. Gold is the preferred reflective layer material.

Binders

The binders are selected to be substantially nonabsorbtive toward the wavelengths of the write and read diode laser light. Examples of binder materials are set forth in subsequent examples.

Sensitizing Dye

A sensitizing dye is any dye that absorbs at a desired wavelength such as 780 nm. Preferable dyes are those which absorb strongly such that, at a concentration of $\leq 5\%$ of the recording layer in the control formulation below, the collimated beam reflectance as measured through the substrate at 780 nm after gold coating is between 50% and 90%.

Leuco Dye

A leuco dye will for the purpose of this disclosure be defined as an organic reagent which absorbs at wavelengths which are shorter than when it is converted to a dye. Such a dye will absorb substantially at longer wavelengths upon activation such as by a thermochemical or photochemical reaction. These chemical reactions include thermally or photochemically induced changes such as oxidation, reduction, protonation, deprotonation, ring opening, metallization, condensation, dehalogenation, dehydrohalogenation, dehydration, rearrangement, polymerization, etc.

Procedure for the Identification of a Leuco Dye Useful in an Optical Recording Element A leuco dye may be identified as being useful in an optical recording element by coating the material in an optical disc format along with a sensitizing dye and a binder, writing on the element with the appropriate wavelength with a focussed laser, and examining the recorded disc for evidence of dye formation.

Test Formulation and Coating

A solution of the materials to be coated can be prepared at 3% solids in a suitable solvent such as methoxypropanol, as defined in Table I. The test leuco dye is present at 40% of the solids. A control formulation is similarly prepared where the test leuco dye is replaced with an equal weight of binder.

TABLE I

| Melt Composition | | Test | Control |
| --- | --- | --- | --- |
| Component | Example | formulation | Formulation |
| Leuco dye | Test dye | 120 mg | 0 mg |
| Sensitizing dye | I (See Example I) | 15 mg | 15 mg |

TABLE I-continued

| Melt Composition | | Test | Control |
|---|---|---|---|
| Component | Example | formulation | Formulation |
| Binder | II (See Example I) | 165 mg | 285 mg |
| Solvent | 1-methoxy-2-propanol | 10 ml | 10 ml |

The solutions are spin coated onto a featureless polycarbonate substrate of compact disc dimensions to a dry thickness of approximately 200 nm (e.g. flood speed of 300 rpm, dwell time/speed of 8.4 sec/500 rpm, ramp speed/time 500-2000 rpm/20 sec). The disc is completed for testing by the sputtering or thermal evaporation of 100 nm or more of a gold reflector layer onto the dye layer. A protective lacquer layer may also be present.

In the test formulation the total amount of sensitizing dye and binder can be conveniently set at 60% of the solids. The amount of the sensitizing dye is selected so that the collimated beam reflectivity as measured through the substrate at 780 nm after gold coating is from 50 to 90%. In the case of dye I (Table I) the sensitizing dye is present at 5% of the solids and affords a reflectivity of 71%.

Disc Testing and Evaluation

The disc is recorded on by a focussed laser operating at near 780 nm. A power series from 4 to 16 mW of 3.56 μm marks and spaces is written to the disc at a spinning velocity of 2.8 m/s. A maximum CNR in the test disc which is greater than in the control disc maximum is suggestive of a useful dye. Confirmation of the utility of the leuco dye is made by evaluation of the electronic wave forms associated with the recorded tracks and/or examination of the tracks microscopically. Wave form analysis must indicate that the recorded signal derives from marks whose reflectivity is reduced through the length of the mark. That is, dye formation occurred rather than dye bleach, which would cause an increase in reflectivity. The control disc must show no persistent reduction in reflectivity through the length of the mark when examined by either the electronic or microscopic technique.

One class of leuco dye that can be used in accordance with this invention is a tellurapyranyl Te(IV) leuco dye that has the following structure:

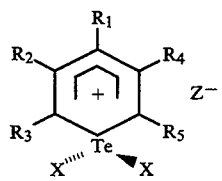

wherein:

$R_1$, $R_3$, and $R_5$ each independently represent hydrogen, alkyl, aryl, $(CR_6=CH)nCR_7$-$A_1$ or $(CH=CH)mA_2$ provided that one, and only one of $R_1$, $R_3$, and $R_5$ is $(CR_6=CH)nCR_7=A_1$ or $(CH=CH)mA_2$; $R_2$ and $R_4$ each independently represents hydrogen, alkyl, or halogen;

$R_2$ and $R_3$, or $R_4$ and $R_5$, taken together with all the carbon atoms to which they are attached, form a mononuclear or polynuclear fused carbocyclic ring having form about 5 to 20 carbon atoms;

$R_6$ and $R_7$ are each independently hydrogen, cyano, akyl or aryl;

$A_1$ represents a monocyclic or polycyclic heterocyclylidene group such as, but not limited to, oxazolylidene, thiazolylidene, selenazolylidene, imidazolylidene, pyranylidene, thiapyranylidene, selenapyranylidene, tellurapyranylidene, oxoindolazinylidene, benzoxazolylidene, benzothiazolylidene, benzoselenazolyidene, benzopyranylidene, benzothiapyranylidene, benzoselenapyranylidene, or benzotellurapyranylidene;

$A_2$ represents aryl, amino, diakylaminoaryl, alkylamino, arylamino, dialkylamino, diarylamino, or a monocyclic or polycyclic heterocyclyl group such as, but not limited to, oxazolyl, tetrahydroquinolinyl, 9-jololidyl, thiazolyl, selenazolyl, imidazolyl, benzoxazolyl, benzothiazolyl, or naphthyl;

n represents a number from 0 to 5;

m represents a number from 0 to 5;

X represents a functional group such as, but not limited to, Br, Cl, F, I, $CH_3CO_2$; and Z represents an anion such as, but not limited to, $BF_4$, $ClO_4$, $CF_3SO_3$, $FSO_3$, $PF_6$, Cl, Br, or I.

A preferred tellurapyranyl Te(IV) material is benzotellurapyranyl Te(IV) materials wherein either $R_2$ and $R_3$, or $R_4$ and $R_5$, taken together with the carbon atoms to which they are attached, form a fused carbocyclic ring having six carbon atoms. They have the structure:

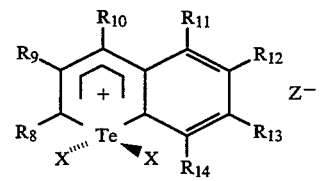

wherein:

$R_8$ and $R_{10}$ each independently represents hydrogen, alkyl, aryl, $(CR_6=CH)_nCR_7$-$A_1$ or $(CH=CH)mA_2$ provided that one, and only one of $R_8$ and $R_{10}$ is $(CR_6=CH)_nCR_7=A_1$ or $(CH=CH)_mA_2$;

$A_1$, $A_2$, $R_6$, $R_7$, n, m, and X are as previously defined;

$R_9$ represents hydrogen or alkyl;

$R_{11}$, $R_{12}$, $R_{13}$, and $R_{14}$ each independently represent hydrogen, alkyl, halogen, hydroxy, or alkoxy.

"Alkyl" includes a branched- or straight-chain hydrocarbon having up to 20 carbon atoms, such as methyl, butyl, dodecyl, tertiary-butyl, and isobutyl as well as substituted alkyl groups such as hydroxyethyl, hydroxypropyl, and the like; "aryl" includes phenyl, naphthyl, anthryl, and the like substituted aryl such alkoxyphenyl and dialkylaminophenyl and the like.

Upon thermal treatment via the write laser and the sensitizing dye, the tellurapyranyl Te(IV) dyes undergo reductive elimination of $X_2$ to give tellurapyrylium dyes having one of the following structures with all groups defined above.

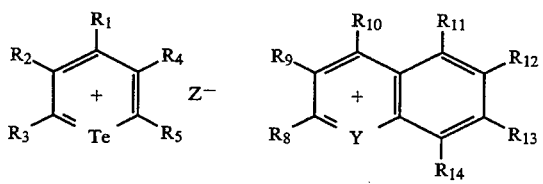

General Procedure for the Preparation of Te(IV) Dichlorides

A stock solution of chlorine in carbon tetrachloride was prepared by bubbling chlorine gas into the solvent. The weight of chlorine added was used to compute molarity (approximately 0.5M). The chlorine solution (1.5 equivalents) was added via syringe to the tellurapyrylium dye in dichloromethane (approximately 0.3M). The resulting solution was stirred 15 min at ambient temperature and was then diluted with an equal volume of ether. The Te(IV) dichloride precipitated, was collected by filtration, washed with ether and dried.

LD2

89% of a red solid, mp 185°–188° C.(dec) (See ref. 5); $\lambda_{max}$(CH$_2$Cl$_2$) 548 nm ($\epsilon$ 55,000 L mol$^{-1}$s$^{-1}$); IR (KBr) 2960, 1550 (s), 1470, 1365, 1313, 835 (s) cm$^{-1}$.

LD4

80% of an orange-gold solid, mp 178°–181° C.(dec); $\lambda_{max}$(CH$_2$Cl$_2$) 532 nm ($\epsilon$ 60,000 L mol$^{-1}$s$^{-1}$); $^1$H NMR (CD$_3$CN) $\delta$ 8.59 (d$\times$d, 1 H, J=12, 15 Hz), 8.46 (s, 2 H), 7.16 (d, 1 H, J=15 Hz), 7.025 (s, 1 H), 6.97 (d, 1 H, J=12 Hz), 6.49 (s, 1 H), 1.61 (s, 18 H), 1.58 (s, 9 H), 1.50 (s, 9 H); IR (KBr) 2960, 1555, 1475, 1365, 963, 838 cm$^{-1}$.

LD6

89% of an orange-gold crystalline solid, mp 198°–202° C.(dec); $\lambda_{max}$ (CH$_2$Cl$_2$) 535 nm ($\epsilon$ 59,000 L mol$^{-1}$s$^{-1}$); $^1$H NMR (CD$_3$CN) $\delta$ 8.64 (d$\times$d, 1 H, J=12, 15 Hz), 8.49 (s, 2 H), 7.18 (d, 1 H, J=15 Hz), 7.05 (s, 1 H), 6.98 (d, 1 H, J=12 Hz), 6.50 (s, 1 H), 1.61 (s, 18 H), 1.58 (s, 9 H); IR (KBr) 2960, 1554, 1470, 1365, 1315, 1280, 1225, 1200 cm$^{-1}$. Anal. Calcd for C$_{29}$H$_{43}$Cl$_2$SeTe.Cl: C, 49.44; H, 6.15. Found: C, 49.44; H, 5.73.

LD10

89% yield of a maroon solid, mp 177°–180° C.(dec);- $\lambda_{max}$ (CH$_2$Cl$_2$) 548 nm ($\epsilon$ 56,000 L mol$^{-1}$s$^{-1}$). Anal. Calcd for C$_{29}$H$_{43}$Cl$_2$Te$_2$.Cl: C, 46.24; H, 5.75. Found: C, 45.80; H, 5.46.

LD11

90% of a jet-black solid, m) 171°–175° C.(dec);$\lambda_{max}$ (CH$_2$Cl$_2$) 530 nm ($\epsilon$ 48,000 L mol$^{-1}$s$^{-1}$); $^1$H NMR (CD$_3$CN) $\delta$ 8.34 (d, 1 H, J=13.7 Hz), 8.14 (br s, 1 H), 7.75 (br s, 1 H), 7.58 (d, 1 H, J=13.7 Hz), 721 (br d, 2 H), 7.03 (s, 1 H), 6.66 (s, 1 H), 3.61 (s, 6 H), 1.57 (s, 9 H), 1.52 (s, 9 H). Anal. Calcd for C$_{23}$H$_{32}$Cl$_2$NTe.PF$_6$:C, 41.48; H, 4.84; N, 2.10. Found: C, 40.87; H, 4.78; N, 2.12.

LD12

54% of a brick-red solid, mp 203°–206° C.(dec);$\lambda_{max}$ (CH$_2$Cl$_2$) 535 nm ($\epsilon$ 59,000 L mol$^{-1}$s$^{-1}$); $^1$H NMR (CD$_3$CN) $\delta$ 8.13 (d, 1 H, J=13.7 Hz), 7.93 (s, 1 H), 7.60 d, 1 H, J=13.7 Hz), 7.59 (s, 1 H), 7.01 (s, 1 H), 6.68 (s, 1 H), 3.91 (br t, 4 H, J=5.5 Hz), 1.88 (br t, 4 H, J=5.5 Hz), 1.57 (s, 9 H), 1.52 (s, 9 H), 1.36 (s, 6 H), 1.32 (s, 6 H). Anal. Calcd for C$^{31}$H$_{44}$Cl$_2$NTe.PF6: C, 48.10; H, 5.73; N, 1.81. Found: C, 47.85; H, 5.54; N, 1.76

General Procedure for the Preparation of Te(IV) Dibromides

A stock solution of bromine in carbon tetrachloride was prepared (approximately 0.5M). The bromine solution (1.5 equivalents) was added via syringe to the tellurapyrylium dye in dichloromethane (approximately 0.3M). The resulting solution was stirred 15 min at ambient temperature and was then diluted with an equal volume of ether. The Te(IV) dibromide precipitated, was collected by filtration, washed with ether, and dried.

LD1

92% of an orange solid, mp 264°–268° C.(dec);$\lambda_{max}$ (CH$_2$Cl$_2$) 522 nm ($\epsilon$ 59,000 L mol$^{-1}$s$^{-1}$); IR (KBr) 2960, 1590 (sh), 1560, 1365, 1313, 1280, 840 cm$^{-1}$. Anal. Calcd for C$_{29}$H$_{43}$Br$_2$STe.PF$_6$: C, 40.69; H, 5.06. Found: C, 39,95; H, 4.84.

LD5

79% of an orange solid, mp 195°–200° C.(dec);$\lambda_{max}$ (CH$_2$Cl$_2$) 544 nm ($\epsilon$ 62,000 L mol$^{-1}$s$^{-1}$); $^1$H NMR (CD$_3$CN) $\delta$ 8.59 (d$\times$d, 1 H, J=12, 15 Hz), 8.46 (s, 2 H), 7.155 (d, 1 H, J=15 Hz), 7.02 (s, 1 H), 6.95 (d, 1 H, J=12 Hz), 6.51 (s, 1 H), 1.61 (s, 27 H), 1.53 (s, 9 H); IR (KBr) 2960, 1590, 1552 (s), 1470, 1363, 1312, 1274, 838 cm$^{-1}$.

LD13

96% of a brick-red solid, mp 185°–189° C. (dec);$\lambda_{max}$ (CH$_2$Cl$_2$) 535 nm ($\epsilon$ 59,000 L mol$^{-1}$s$^{-1}$); $^1$H NMR (CD$_3$CN) $\delta$ 8.14 (d, 1 H, J=13.7 Hz), 7.93 (s, 1 H), 7.58 (d, 1 H, J=13.7 Hz) 7.60 (s, 1 H), 7.01 (s, 1 H), 6.68 (s, 1 H), 3.91 (br t, 4 H, J=5.5 Hz), 1.89 (br t, 4 H, J=5.5 Hz), 1.60 (s, 9 H), 1.52 (s, 9 H), 1.36 (s, 6 H), 1.32 (s, 6 H). Anal. Calcd for C$_{31}$H$_{44}$Br$_2$NTe.PF$_6$: C, 43.14: H, 5.14; N, 1.62. Found: C, 42.62; H, 5.04; N, 1.58.

The following examples are presented for a further understanding of the invention:

Leuco dyes are well known intermediates in dye formation. Samples of the following leuco dyes have been prepared and converted into permanent dyes that are usable in accordance with this invention. These compounds are prepared by the following:

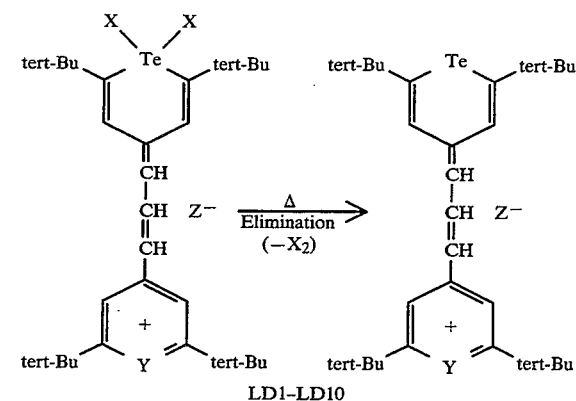

LD1–LD10

-continued

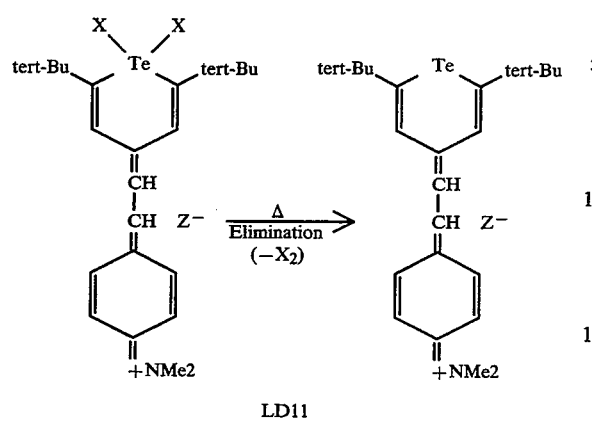

LD11

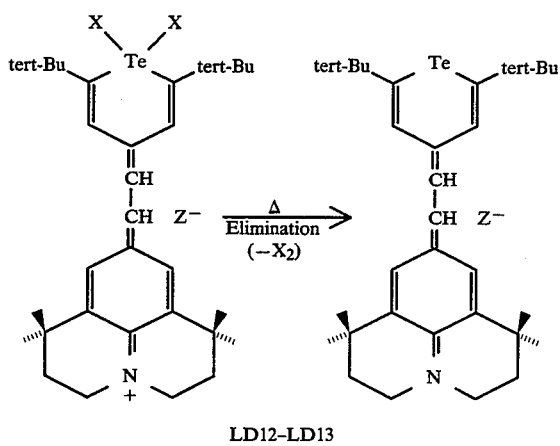

LD12–LD13

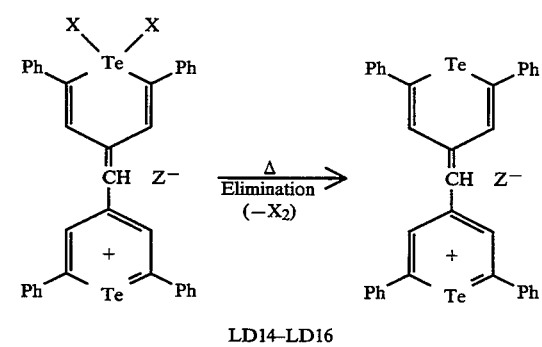

LD14–LD16

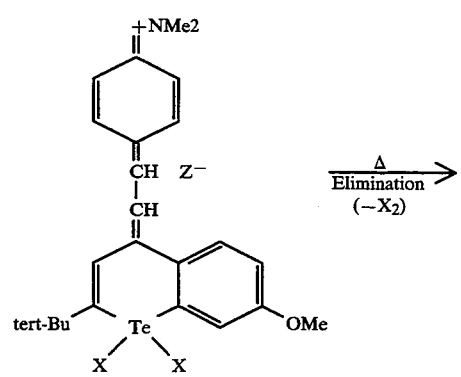

-continued

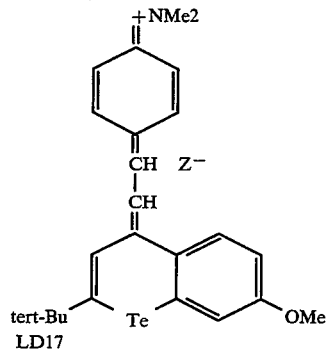

LD17

Structural details and spectral data for such leuco dyes and permanent dyes are compiled in Table II.

TABLE II
Tellurapyranyl Dihalide Leuco dyes Which Generate Near-Infrared-Absorbing Dyes Upon Heating

| Compound | R | X | Y | Z | Leuco dye $\lambda_{max}$ (CH$_2$Cl$_2$), nm | Reduced Dye $\lambda_{max}$ (CH$_2$Cl$_2$), nm |
|---|---|---|---|---|---|---|
| LD1  | H   | Br | S  | PF$_6$   | 535 | 750 |
| LD2  | H   | Cl | Te | PF$_6$   | 548 | 833 |
| LD3  | H   | Br | Se | Cl       | 541 | 786 |
| LD4  | H   | Cl | Se | Cl       | 544 | 786 |
| LD5  | H   | Br | Se | PF$_6$   | 544 | 786 |
| LD6  | H   | Cl | Se | PF$_6$   | 532 | 786 |
| LD7  | H   | Br | Te | PF$_6$   | 565 | 833 |
| LD8  | H   | Br | Te | Cl       | 565 | 833 |
| LD9  | CH$_3$ | Cl | Se | ClO$_4$ | 542 | 847 |
| LD10 | H   | Cl | Te | Cl       | 548 | 833 |
| LD11 | —   | Cl | —  | PF$_6$   | 530 | 713 |
| LD12 | —   | Cl | —  | PF$_6$   | 524 | 768 |
| LD13 | —   | Br | —  | PF$_6$   | 525 | 768 |
| LD14 | —   | Br | —  | BF$_4$   | 525 | 760 |
| LD15 | —   | Cl | —  | BF$_4$   | 497 | 760 |
| LD16 | —   | I  | —  | BF$_4$   | 530 | 760 |
| LD17 | —   | Cl | —  | PF$_6$   | 544 | 753 |

A second class of leuco dye that can be used in accordance with this invention is a chalcogenapyran of the following structures:

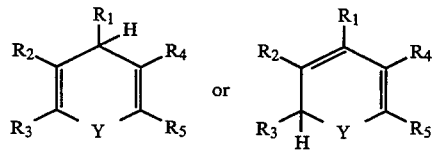

wherein:
Y is O, S, Se, or Te and $R_1$, $R_2$, $R_3$, $R_4$, and $R_5$ are as described above. Alternatively, the leuco dye may have the following structure:

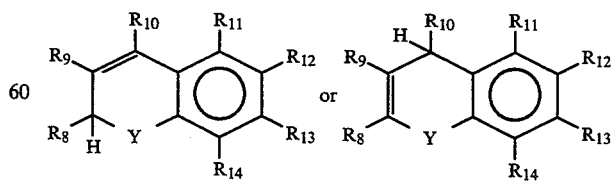

wherein:
Y is O, S, Se, or Te and $R_8$, $R_{10}$, $R_{11}$, $R_{12}$, $R_{13}$ and $R_{14}$ are as described above. Alternatively, the leuco dye may have the following structure:

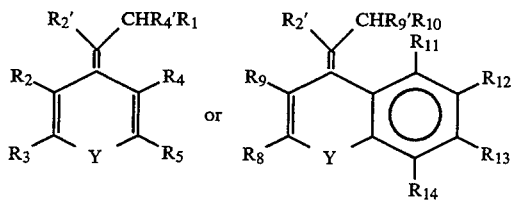

wherein:

Y is O, S, Se, or Te and $R_1$, $R_2$, $R_3$, $R_4$, $R_5$ $R_8$, $R_{10}$, $R_{11}$, $R_{12}$, $R_{13}$ and $R_{14}$ are described above and $R_2'$ is defined the same as $R_4$, and $R_9'$ is defined the same as $R_9$.

These leuco dyes are oxidized to infrared-absorbing dyes upon thermal or photochemical reaction of the write laser with a thermal acid generator or photoacid generator, respectively.

General Procedure for Leuco dye Synthesis

The chalcogenapyrylium dye was dissolved in ethanol (1 gram of dye in 50 to 250 mL of ethanol). Excess sodium borohydride (approximately 0.1 gram of sodium borohydride per gram of dye) was added. After the dye color had faded indicating complete consumption of dye, the reaction mixture was poured into water and the leuco dyes were extracted with dichloromethane. The combined dichloromethane extracts were dried over sodium sulfate and concentrated to give the leuco dyes LD19, LD20, LD22, and LD23.

Sodium borohydride reduction of chalcogenapyrylium dyes in ethanol gives excellent yields of neutral leuco dyes from hydride addition. As shown below, hydride addition occurs primarily at the central methine carbon to give symmetrical leuco dyes LD19. The minor products from these reactions gave hydride addition at the carbons bearing the tert-butyl groups. The overall chemical yield was 79% for the reduction of 18a, 85% for the reduction of 18b, and 91% for the reduction of 18c.

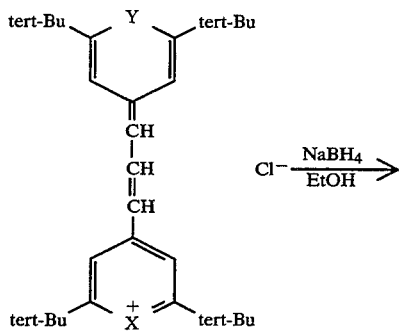

18a, X = Y = Se
18b, X = Y = Te
18c, X = Se, Y = S

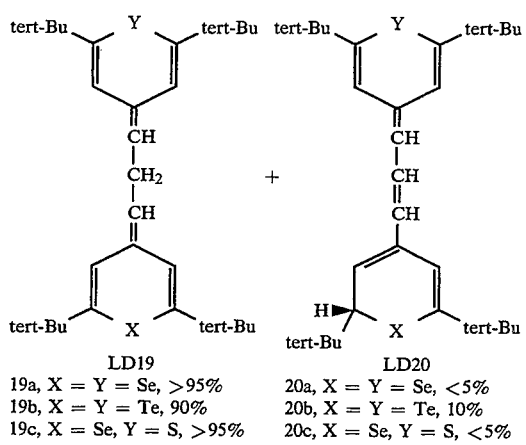

LD19
19a, X = Y = Se, >95%
19b, X = Y = Te, 90%
19c, X = Se, Y = S, >95%

LD20
20a, X = Y = Se, <5%
20b, X = Y = Te, 10%
20c, X = Se, Y = S, <5%

The structural assignments of LD19 and LD20 followed from $^1$H NMR spectra. The symmetrical products LD19 were characterized by a triplet for the central methylene and doublets for the two bridging methine signals. For LD19a and LD19b, two tert-butyl signals were apparent as were two olefinic signals for the pyranyl protons. Compound 19c was characterized by four tert-butyl signals, four olefinic singlets, and two sets of olefinic doublets. For compounds LD30, four tert-butyl signals were accompanied by a non-olefinic methine doublet, and three olefinic singlets. The field desorption mass spectra of the mixtures were consistent with the addition of a hydride to the dye nucleus.

The regiochemistry of hydride addition was sensitive to the steric bulk of substituents. The dichloro trimethine dye 21 gave a much different product ratio upon hydride reduction. The symmetrical selenapyranyl compound LD22 was the minor component (30% of the mixture) while the unsymmetrical selenapyran LD23 was the major component (70% of the mixture). The chlorine groups are much larger than a proton leading to decreased hydride addition at the central methine carbon atom. The mixture of LD22 and LD23 was isolated in 86% yield.

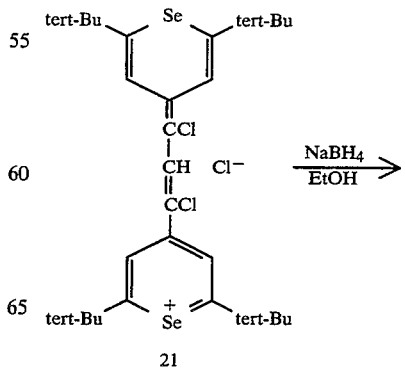

21

-continued

[Structures: LD22, 30% and LD23, 70%]

Preparation and Operation of CD Discs

EXAMPLE I

A solution was prepared by mixing the following chemicals and filtering through a 0.2 micron filter to remove any insoluble residue.

| Sensitizing Component | Reference | Amount |
|---|---|---|
| Dye | I (See Below) | 7.5 mg |
| Leuco dye | LD1 | 60.0 mg |
| Binder | II (See Below) | 82.5 mg |
| Solvent | 1-Methoxy-2-propanol | 5.0 ml |

The following is an example of how to form a recordable element:

[Structure I]

[Structure II]

| R | Mole Percent |
|---|---|
| [naphthyl] | 50 |

-continued

| | |
|---|---|
| [4-methoxyphenyl (MeO-C6H4-)] | 33 |
| [4-bromophenyl (Br-C6H4-)] | 17 |

The recording layer was formed by spin coating the solution onto a 120 mm featureless polycarbonate substrate to a thickness of approximately 200 nm.

A gold reflector layer approximately 130 nm thick was applied to the recording layer by resistive heating vacuum evaporation.

The optical recording medium had a reflectivity of 61.4% when measured through the substrate with collimated light at 780 nm.

The disc was recorded on by a focused laser (788 nm) operating through the substrate, while spinning at 2.4 m/s, 2× the normal CD speed. Dark marks on a reflective background were formed as evidenced by their wave forms and by subsequent examination of the recording by brightfield microscopy at 780 nm.

A 4–16 mW power series of I11 marks was written on the disc. When read back with the write laser at reduced power (0.6 mW), the disc exhibited good recording contrast and sensitivity. A CNR of 61 dB was obtained at 10 mW write power.

A track of I11 marks (i.e. mark=space=3.56 um) was recorded at 10 mW and the optical contrast (I11/Itop) was found to be 0.73. A track of I3 marks (0.97 μm marks and spaces) gave an optical contrast of 0.28.

EXAMPLE II

The procedure of Example I was repeated except that LD2 (Table II) was employed as the leuco dye. Dark marks on a reflective background were formed as evidenced by brightfield microscopy at 780 nm. The CNR of a track of I11 marks was found to be 48 dB at 16 mW while a control coating without leuco dye exhibited a CNR of only 34 dB.

EXAMPLE III

The procedure of Example I was repeated except that LD4 (Table II) was employed as the leuco dye. Dark marks on a reflective background were formed as evidenced by brightfield microscopy at 780 nm. The CNR of a track of I11 marks was found to be 55 dB at 16 mW while a control coating without leuco dye exhibited a CNR of only 34 dB.

EXAMPLE IV

The procedure of Example I was repeated except that LD6 (Table II) was employed as the leuco dye. Dark marks on a reflective background were formed as evidenced by brightfield microscopy at 780 nm. The CNR of a track of I11 marks was found to be 51 dB at 16 mW while a control coating without leuco dye exhibited a CNR of only 34 dB.

EXAMPLE V

The thermal acid generator chosen for the following example was a compound which has the structure:

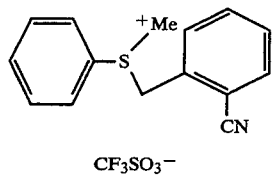

III

CF$_3$SO$_3^-$

Generation of trifluoromethanesulfonic acid would be initiated via thermal formation of the ortho-cyanobenzyl radical and thioanisole cation radical.

Preparation of an Optical Disc

Two solutions were prepared by mixing the following chemicals and filtering through a 0.2 micron filter to remove any insoluble residue.

| Component | Solution 1 | Solution 2 |
|---|---|---|
| Sensitizing Dye I | 15 mg | 15 mg |
| Leuco dye LD-23 | None | 100 mg |
| Thermal Acid III | None | 100 mg |
| Binder III | 285 mg | 85 mg |
| 1-Methoxy-2-propanol | 10 cc | 10 cc |

Optical discs were prepared by spin coating the solutions onto 120 mm featureless polycarbonate substrates to a thickness of approximately 200 nm. A gold reflector layer approximately 130 nm thick was applied to the layers by resistive heating vacuum evaporation.

The discs were recorded on by a focused laser (788 nm) operating through the substrate, while spinning at 2.4 m/s. A power series of Ill marks was written on the discs.

The disc (#2) prepared from Solution 2 afforded a focused beam reflectivity of 58%. Writing caused the formation of dark marks on the reflective background as evidenced by the electronic wave forms and by microscopic observation (780 nm brightfield illumination). Ill/Itop increased to 0.30 through the 2–18 mW power series. The CNR signal peaked at 44 dB.

In the control disc (#1), prepared from the Solution 1, the focused beam reflectivity was 66%. Writing caused slight marking of the media as evidenced by distortion of the gold layer as seen by gold incident DIC microscopy. This was comparable to that observed in disc #1. However, there was no observation of dark marks on the reflective background when observed throughout the substrate under 780 brightfield illumination, nor was there any observation of a significant electronic wave form indicative of reduced reflectivity. Ill/Itop stayed at 0.04±0.01 throughout the 2–18 mW power series. CNR peaked at 34 dB.

The invention has been described in detail with particular reference to certain preferred embodiments thereof, but it will be understood that variations and modifications can be effected within the spirit and scope of the invention.

What is claimed is:

1. A recordable optical element having a substrate and on the surface of said substrate, a dye-containing recording layer and a light reflecting layer, the improvement wherein said dye is a tellurapyranyl Te(IV) leuco dye which upon thermal reduction becomes a near-infrared absorption tellurapyranyl dye.

2. A recordable optical element having a substrate and on the surface of said substrate, a recording layer and a light reflecting layer, the improvement wherein said recording layer includes:

a tellurapyranyl Te(IV) leuco dye which upon thermal reduction becomes a near-infrared absorption tellurapyranyl dye; and a sensitizing dye that absorbs near-infrared light to produce a thermal reduction of said leuco dye.

3. A recordable optical element according to claim 2 wherein said leuco dye is benzotellurapyranyl Te(IV) and when thermally reduced forms a near-infrared absorbing tellurapyranyl dye having a fused carbocyclic ring with six carbon atoms.

4. A recordable optical element according to claim 2 wherein leuco dye is benzotellurapyranyl Te(IV) and when thermally reduced forms a near-infrared absorbing tellurapyranyl dye having a fused carbocyclic ring with six carbon atoms.

5. The recordable optical element of claim 1 wherein said leuco dye has the structure:

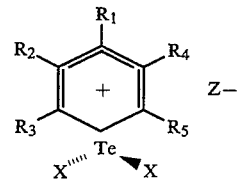

wherein:

R$_1$, R$_3$, and R$_5$ each independently represent hydrogen, alkyl, aryl, (CR6=CH)nCR7-A1 or (CH=CH)mA2 provided that one, and only one of R$_1$, R$_3$, and R$_5$ is (CR6=CH)nCR7=A1 or (CH=CH)mA2; R$_2$ and R$_4$ each independently represents hydrogen, alkyl, or halogen;

R$_2$ and R$_3$, or R$_4$ and R$_5$, taken together with all the carbon atoms to which they are attached, form a mononuclear or polynuclear fused carbocyclic ring having form about 5 to 20 carbon atoms;

R$_6$ and R$_7$ are each independently hydrogen, cyano, akyl or aryl;

A1 represents a monocyclic or polycyclic heterocyclylidene group;

A2 represents aryl, amino, diakylaminoaryl, alkylamino, arylamino, dialkylamino, diarylamino, or a monocyclic or polycyclic heterocyclyl group such as, but not limited to, oxazolyl, tetrahydroquinolinyl, 9-jololidyl, thiazolyl, selenazolyl, imidazolyl, benzoxazolyl, benzothiazolyl, or naphthyl;

n represents a number from 0 to 5;

m represents a number from 0 to 5;

X represents a functional leaving group; and

Z represents an anion.

6. In a recordable element having a substrate and on the surface of said substrate, a recording layer and a light-reflecting layer, the improvement comprising:

wherein said recording layer includes a chalcogenapyranyl leuco dye which upon exposure to a thermally-generated acid becomes a near-infrared absorbing chalcogenapyrylium dye.

7. A recordable element having a substrate and on the surface of said substrate, a recording layer and a light-reflecting layer, the improvement wherein said recording layer includes:

a chalcogenapyranyl leuco dye which upon exposure to a thermally-generated acid becomes a near-infrared absorbing chalcogenapyrylium dye;

a sensitizing dye that absorbs near infrared light to produce heat which can be used to generate a thermal acid; and a thermal acid generator which, upon heating, produces a strong acid which can be used to oxidize a leuco dye.

8. A recordable optical element according to claim 7 wherein said leuco dye is a benzochalcogenapyranyl leuco dye and when thermally oxidized by a thermal acid forms a near-infrared-absorbing chalcogenapyrylium dye having a fused carbocyclic ring with six carbon atoms.

9. The recordable optical element of claim 7 wherein said leuco dye has the structure:

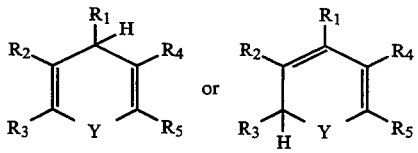

wherein:

Y is O, S, Se, or Te and wherein:

$R_1$, $R_3$, and $R_5$ each independently represent hydrogen, alkyl, aryl, (CR6=CH)nCR7-A1 or (CH=CH)mA2 provided that one, and only one of $R_1$, $R_3$, and $R_5$ is (CR6=CH)nCR7=A1 or (CH=CH)mA2; $R_2$ and $R_4$ each independently represents hydrogen, alkyl, or halogen;

$R_2$ and $R_3$, or $R_4$ and $R_5$, taken together with all the carbon atoms to which they are attached, form a mononuclear or polynuclear fused carbocyclic ring having form about 5 to 20 carbon atoms.

10. The recordable optical element of claim 7, wherein said leuco dye has the structure:

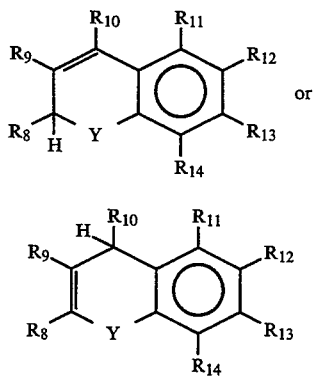

wherein:

Y is O, S, Se, or Te and wherein:

$R_8$ and $R_{10}$ each independently represents hydrogen, alkyl, aryl, (CR6=CH)nCR7-A1 or (CH=CH)mA2 provided that one, and only one of $R_8$ and $R_{10}$ is (CR6=CH)nCR7=A1 or (CH=CH)mA2;

$R_9$ represents hydrogen or alkyl;

$R_{11}$, $R_{12}$, $R_{13}$, and $R_{14}$ each independently represent hydrogen, alkyl, halogen, hydroxy, or alkoxy.

11. The recordable optical element of claim 7 wherein said leuco dye has the following structure:

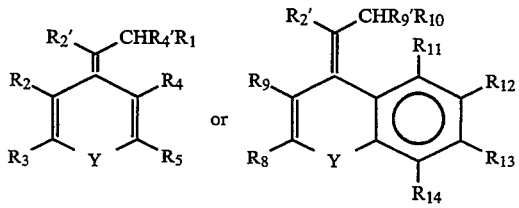

wherein:

Y is O, S, Se or Te and wherein:

$R_1$, $R_3$, and $R_5$ each independently represent hydrogen, alkyl, aryl, (CR6=CH)nCR7-A1 or (CH=CH)mA2 provided that one, and only one of $R_1$, $R_3$, and $R_5$ is (CR6=CH)nCR7=A1 or (CH=CH)mA2; $R_2$ and $R_4$ each independently represents hydrogen, alkyl, or halogen;

$R_2$ and $R_3$, or $R_4$ and $R_5$, taken together with all the carbon atoms to which they are attached, form a mononuclear or polynuclear fused carbocyclic ring having form about 5 to 20 carbon atoms;

$R_6$ and $R_7$ are each independently hydrogen, cyano, akyl or aryl;

$R_8$ and $R_{10}$ each independently represents hydrogen, alkyl, aryl, (CR6=CH)nCR7-A1 or (CH=CH)mA2 provided that one, and only one of $R_8$ and $R_{10}$ is (CR6=CH)nCR7=A1 or (CH=CH)mA2;

$R_9$ represents hydrogen or alkyl;

$R_{11}$, $R_{12}$, $R_{13}$, and $R_{14}$ each independently represent hydrogen, alkyl, halogen, hydroxy, or alkoxy; and $R_2'$ is defined the same as $R_2$, $R_4'$ is defined the same as $R_4'$ and $R_9'$ is defined the same as $R_9$.

12. An optical recording element comprising a substrate; on the surface of the substrate, a single dye containing recording layer having a molecularly dispersed mixture of a sensitizing dye and a leuco dye; and a light reflecting layer.

13. The recordable optical element of claim 12 wherein the leuco dye upon thermal reaction becomes a near-infrared absorption dye and the sensitizing dye is selected so that is absorbs near-infrared light to produce a thermal reaction of the leuco dye.

* * * * *